United States Patent [19]

Maniak

[11] 3,874,749

[45] Apr. 1, 1975

[54] GAS SUSPENDED BEARING

[75] Inventor: Dominic J. Maniak, Minneapolis, Minn.

[73] Assignee: The Pillsbury Company, Minneapolis, Minn.

[22] Filed: Dec. 3, 1973

[21] Appl. No.: 421,000

[52] U.S. Cl. ............ 308/9, 308/DIG. 1, 193/35 MD
[51] Int. Cl. ...................... F16c 39/04, B65g 13/00
[58] Field of Search ......... 308/6 R, 9, 20, 187, 188, 308/199, 200, DIG. 1; 193/35 MD; 214/1 BE; 302/29

[56] References Cited
UNITED STATES PATENTS

| 2,931,477 | 4/1960 | Metzgar | 308/6 R |
| 3,195,963 | 7/1965 | Anderson | 308/9 |
| 3,201,181 | 8/1965 | Cherubim | 308/9 |
| 3,273,727 | 9/1966 | Rogers et al. | 214/1 BE |

*Primary Examiner*—Lloyd L. King
*Assistant Examiner*—Robert Saifer
*Attorney, Agent, or Firm*—James V. Harmon; Michael D. Ellwein

[57] ABSTRACT

A gas suspended caged ball caster is described which consists of a ball within a round socket having about the same radius as the ball. Air is supplied to the socket through a duct to support the ball a slight distance above the surface of the socket and provide a load supporting air film between the socket and the ball to support a load applied to the exposed part of the ball. A ball retainer is provided to prevent the ball from coming out of the socket and to define a chamber containing air above atmospheric pressure on the upper side of the ball. A hole is provided in the retaining means through which a portion of the ball projects.

4 Claims, 5 Drawing Figures

FIG. 4
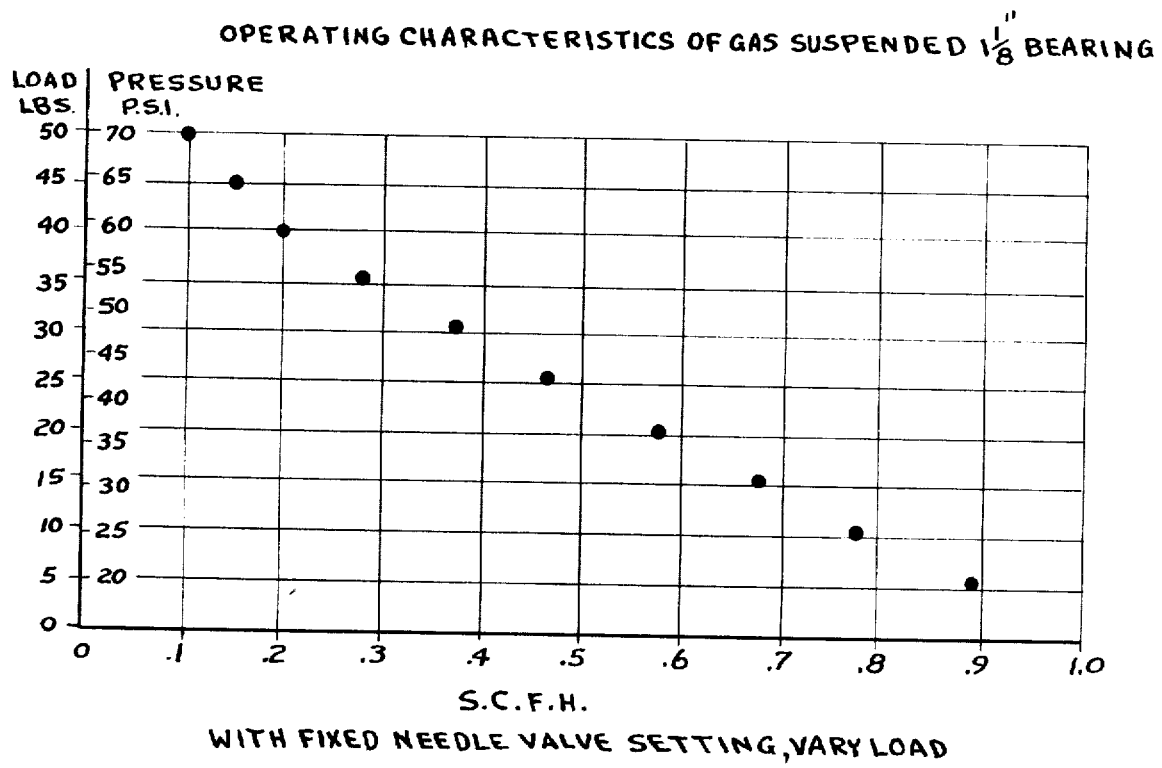
OPERATING CHARACTERISTICS OF GAS SUSPENDED 1⅛" BEARING
WITH FIXED NEEDLE VALVE SETTING, VARY LOAD
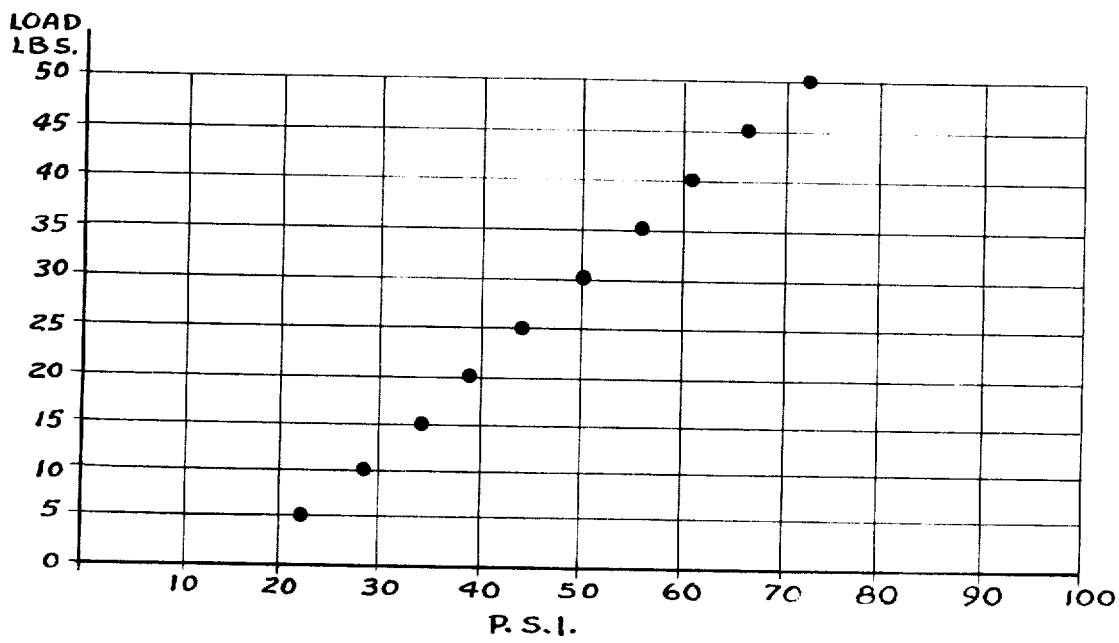
FLOW RATE CONSTANT, LOAD VARIED
FIG. 5

GAS SUSPENDED BEARING

BACKGROUND OF THE INVENTION

A great many gas supported ball bearings have been previously proposed. The utility of many is limited because the balls are not caged. In others such as that described in U.S. Pat. No. 2,944,684 in which the balls are caged, the load supporting ability of the ball is severely limited even with substantial air pressures. In still others, such as British Pat. No. 946,200 dated Jan. 8, 1964, the ball shown in certain embodiments is caged but requires a series of very small balls to support the main one thereby losing the frictionless characteristics of a bearing supported entirely by air or other gas.

THE OBJECTS

The provision of an improved gas support ball bearing wherein (a) the ball is caged and supported solely by air pressure so that normally there is no physical contact between the ball and objects other than the load supported by the ball, (b) provision for supporting the ball within a cavity having a shape conforming to a portion of a sphere of the same diameter as the ball itself and a smooth, mirror-like surface, (c) provision for caging the ball on its upper exposed side with means to prevent the ball from being seated by air pressure against the cage, (d) an improved method of manufacturing the air supported bearing, (e) the provision of an improved, air supported ball bearing which will function effectively with air supplied thereto at a relatively low flow rates such as 0.1 to 0.2 SCFH (standard cubic feet per hour where "standard" implies standard conditions of temperature and pressure) and (f) a further provision for venting air from the ball housing in addition to that which is exhausted from the hole through which the ball projects.

SUMMARY OF THE INVENTION

The invention provides an air suspended, caged i.e., captive ball caster bearing which includes a load supporting ball housing having a recess or socket conforming substantially to the surface of a ball mounted therein and which has the shape of a portion of the sphere with substantially the same radius as the ball. A gas supply duct, usually air, is connected in communication with the recess for supplying air thereto to provide a load supporting film between the ball and the recess on the lower side of the ball. A ball retaining means is connected to the housing and encloses at least a portion of the top of the ball to prevent the ball from falling out. In one preferred form of the invention it defines an air chamber on the upper portion of the ball from which at least part of the supplied air escapes upwardly around the ball. The ball retaining means is provided with a central opening through which a portion of the ball projects. It is this portion of the ball which contacts the load that is to be supported.

In one preferred form of the invention, an air release passage is provided in the retainer to permit at least some of the air supplied through the duct to escape around the ball even when the ball is pressed upwardly thereagainst thereby preventing the ball from seating and sealing the retainer against the further escape of air. The ball receiving recess is normally approximately hemispherical or corresponds in shape to a sphere cut in the vicinity of a diameter so that it is somewhat smaller than a hemisphere.

The recess is preferably formed by pressing the ball into a ductile material from which the housing is composed thereby forming a smooth, highly polished surface having a radius almost identical with that of the ball.

THE FIGURES

FIGS. 4 and 5 are graphs relating load, pressure and gas flow.

DESCRIPTION OF THE PREFERRED EMBODIMENT

The invention will be shown or described by way of example in connection with providing bearings for a conveyor but it will be understood that the invention can be utilized in a variety of other ways, for example, as bearings on the lower surface of an object that is to be moved across a horizontal surface in which event the bearings will function as wheels for the article or vehicle and the directions "up" and "down," "top" and "bottom" as used herein will be reversed and should be considered relative to the ball housing rather than relative to the earth. The invention can also be used in such diverse applications as bearings for rectilinear motion devices. Thus, several bearings can be distributed at different longitudinally spaced points around the circumference of a shaft to provide an air bearing for rectilinear motion of the shaft on its longitudinal axis. Since one of the most useful applications for the invention is for the support of objects being transported on a conveyor, this application will be described by way of example.

Figure 1:
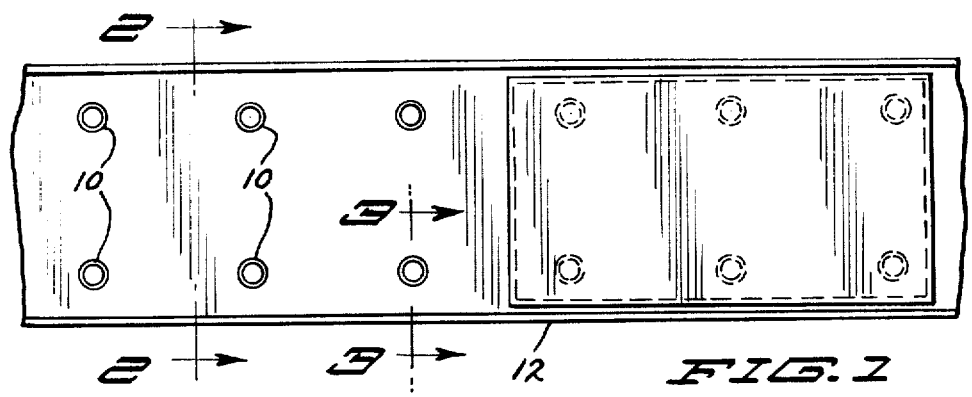
FIG. 1 is a plan view of a conveyor using the invention.

As seen in FIG. 1, the air supported ball caster bearings 10 are mounted at spaced apart locations on a conveyor 12, in this instance by distributing the bearings 10 which are all identical in columns and rows along the floor of the conveyor. The conveyor 12 itself is made of sheet metal and comprises parallel side walls 12a and a horizontal bottom wall 12b connected between the lower edges of the side walls with openings 12c for the bearings 10.

Figure 3:
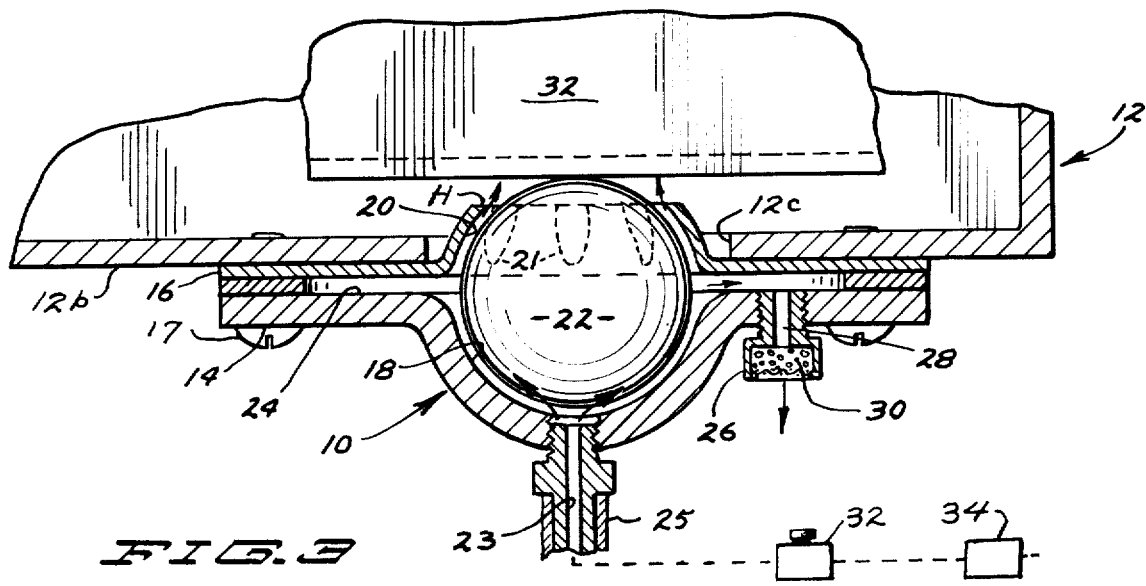

The bearings 10 as best seen in FIG. 3 are each made up of a support means or housing 14 and an upper ball retainer 16 held in place by screws 17. The housing 14 is provided with a load supporting recess 18 having the same surface configuration and radius almost identical with the ball 22. It also has a smooth highly polished inner surface. Similarly the retainer 16 has an inward surface 20 which is in the embodiment shown a section of a sphere having substantially the same radius as the ball 22. The surface 20 need not, however, be spherical or even rounded in configuration. It can, for example, be a frustocone or some other shape provided that (a) it defines an enclosure on the upper side of the ball for retaining the ball in place, (b) includes an opening at the top thereof through which a portion of the ball 22 is able to extend and (c) a provision for allowing air to escape even when the ball is pressed up against its inward surface. As seen in FIG. 3, the retainer 20 is provided with an opening H to permit the ball 22 to project above its surface.

Air is supplied to the recess 18 and the housing 14 by means of an air duct 23 and which is preferably located in the precise center of the recess 18 thereby supplying air equally to all sides of the lower portion of the ball 22 for forming an air film between the ball and the recess 18 to support the ball and the load 32.

The air supplied to the ball recess 18 through duct 23 is allowed to escape two different ways in accordance with the preferred form of the invention. In the first of these, air escapes through an air release passage means such as grooves 21 provided in the ball retaining means 16. The grooves extend longitudinally of the ball and are spaced circumferentially about the opening H within the retaining means to prevent the seating of the ball against the retainer 16 which if allowed to take place would prevent the further escape of air.

The second opening through which air is released is vent 28 which has a cover 26 containing a silencer screen 30 composed of sintered metal balls that offer substantially no resistance to the free flow of air through the vent. The vent 28 is optional whenever the combined cross sectional area of the air releasing grooves 21 is sufficient to allow the supplied air to escape. However, the presence of vent 28 is preferred since at higher flow rates, the grooves may not be sufficient to exhaust all of the air supplied to the ball. In that case, vent 28 takes care of this excess. It can be seen that air vent 26 permits the venting of air before the air travels upwardly around the outside of the upper aspect of the ball within the ball retaining means 16. The grooves 21 are spaced at equal distances from one another around the inside surface of the retainer 16. It will also be seen that the bearing 22 is free rolling, self-cleaning, and has no wear points between the ball and the ball housing due to the cushion of air between them.

As shown diagrammatically in FIG. 3, air is supplied to line 25 from a metering means such as a needle valve 32. Air is in turn supplied to the metering valve 32 from a pressure regulator 34 which is set, for example, to supply air through line 25 at 50 p.s.i. During operation, the needle valve 32 reduces the flow to each of the balls 10 and as the gap between the ball 22 and the recess 18 is reduced due to the weight of the load 32, the pressure therein will gradually increase up to the amount set at the pressure regulator 34.

The preferred method of making the recess 18 in the housing 14 is to form the housing from a flat sheet of ductile metal such as soft aluminum. This sheet is placed on top of a ring having an opening in the center somewhat larger in diameter than that of the recess 18. The ball is then placed on top of the plate in the center of the ring which is below the plate and pressed downwardly against the aluminum sheet acting as a die to deform the ductile material and thereby impress the form of the ball into the housing 14. The recess thus formed will then have a highly polished, smooth surface and a radius which is almost identical to ball 22. The hole for the air supply duct 23 is preferably drilled after pressing and is preferably located in the center of the recess 18. In addition to being a very inexpensive forming operation, each recess 18 matches exactly to the size of the ball with which it is associated. This can be important when the balls vary slightly in diameter. The amount of vertical clearance for the ball can vary, but satisfactory results have been obtained when the ball is allowed to have freedom of movement in the vertical direction in its caged position within the housing of about one-sixteenth inch. In this way, an air film between the ball and the recess 18 of a few thousandths of an inch can be readily maintained and the ball accordingly will be able to support substantial weights for a given air pressure and flow rate.

Figure 2:
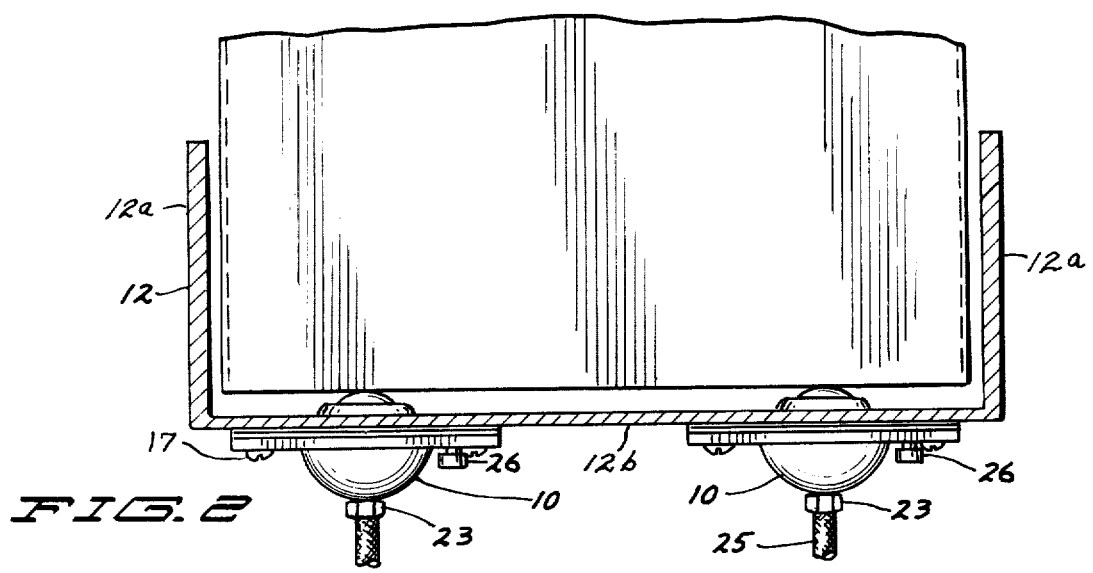
FIG. 2 is a vertical section view taken on line 2—2 of FIG. 1 on an enlarged scale and FIG. 3 is a partial vertical sectional view taken on line 3—3 of FIG. 1 on a still larger scale.

In a model of the embodiment of the invention shown in FIGS. 1 – 3 in which the ball is 1⅛ inches in diameter, loads indicated in FIGS. 4 and 5 were supported at the pressure shown. The relationship indicated in FIG. 4 was found with the needle valve setting held constant and the applied load varied. This caused the flow rate to vary. Thus the minimum flow rate needed to support a 50 lb. load is about 0.1 cu. ft./hr.

In FIG. 5 the flow rate is held constant at 0.25 SCFH. This is accomplished by changing the load and then adjusting the needle valve 32 to bring the flow to 0.25 SCFH. It can be seen that in a typical application of say 100 ball units loaded to 50 lb. each, the air requirements would be only around 10 – 20 SCFH. At the lower flow rates obstruction by dust could however, become a problem.

The pressure regulator 34 is optional but is usually provided in commercial installations to keep air pressure to a safe level.

From this description it can be seen that the ball is normally supported solely by air during operation and is consequently characterized by an almost frictionless operation.

The opening 23 can best be offset from the center when rotation of the ball is desired for imparting translatory movement to the objects 32 being moved upon the conveyor 12. Thus, for example, if duct 23 is moved toward the left in FIG. 3, the ball will tend to rotate in a clockwise direction as seen in the figure.

Each recess 18 can be made by its corresponding ball 22 or by another sphere having the form of said ball.

What is claimed is:

1. A gas suspended caged ball bearing comprising a load supporting ball housing formed from a ductile material having a pressure formed recess therein conforming to the shape of the portion of a sphere, said ductile material being displaced by the pressure application of the form of said ball thereagainst to define said recess and provide a smooth surface therein, said ball being located in the recess with substantially the same radius as the recess, a gas supply duct means communicating with the recess for supplying gas thereto to provide a load supporting gas film between the ball and the recess on the lower side of the ball, a ball retaining means connected to the housing and enclosing the top side of the ball to prevent the ball from falling out, said retaining means exposing the top of the ball whereby the top portion of the ball projects upwardly and is adapted to contact a load and at least one gas releasing passage communicating between the interior of the housing and the exterior thereof around the portion of the ball in the retaining means for releasing gas supplied to the housing through the duct under all conditions including times when the ball is pressed against the retaining means to prevent the ball from sealing the retaining means against the escape of the gas.

2. The apparatus of claim 1 wherein the gas release passage means comprises a plurality of grooves in the inside surface of the ball retaining means, said grooves extend longitudinally of the ball and are spaced circumferentially around the inside surface of the retaining means to thereby allow the escape of air around the upper aspect of the ball.

3. The apparatus of claim 1 wherein a supplemental gas release vent is provided to allow the escape of gas before the gas passes around the portion of the ball in the retaining means.

4. The apparatus of claim 1 wherein the gas release passage means comprises a plurality of grooves in the inside surface of the retaining means spaced an equal distance from one another on the inside surface of the ball retaining means.

\* \* \* \* \*